INVENTORS
PETER J. H. JANSSEN
WOUTER SMEULERS
BY
Frank R. Jifari
AGENT

Nov. 27, 1962 P. J. H. JANSSEN ETAL 3,066,183

TELEVISION RECEIVER CONTROL CIRCUIT RESPONSIVE TO DISTORTED SIGNALS

Filed May 4, 1960 2 Sheets-Sheet 2

INVENTORS
PETER J. H. JANSSEN
WOUTER SMEULERS
BY Frank R. Trifari
AGENT 3,066,183

TELEVISION RECEIVER CONTROL CIRCUIT RESPONSIVE TO DISTORTED SIGNALS

Peter Johannes Hubertus Janssen and Wouter Smeulers, Eindhoven, Netherlands, assignors to North American Philips Company Inc., New York, N.Y., a corporation of Delaware Filed May 4, 1960, Ser. No. 26,843
Claims priority, application Netherlands May 6, 1959
5 Claims. (Cl. 178—7.3)

This invention relates to a television receiver control circuit that is responsive to distorted input signals or the absence of input signals, for disenabling a portion of the receiver.

In television receivers the following two conditions may exist:

(1) A television signal is not received at all so that in the receiver itself a noise signal is developed (for example thermal noise) or an interfering signal is amplified (aerial noise). Such a noise signal, after being detected and applied to the video output tube and to the raster-synchronizing and line-synchronizing devices, has an interfering influence.

(2) A television signal is received, but this signal is distorted due to incorrect tuning of the receiver. Such may be the case when the high-frequency portion is out of tuning to an extent such that the acoustic signal is insufficiently attenuated in the intermediate-frequency portion of the receiver. This signal then reaches not only the audio-frequency channel, but also penetrates to the other channels of the receiver, which is undesirable.

Consequently, means are required for preventing the developed noise signal or the distorted television signal from penetrating to the undesired channels. For this purpose, an infromation source must be available which can deliver a voltage for blocking the circuits that the unwanted signals must not penetrate.

The obvious information source, namely the circuit for automatic volume control in the receiver, cannot be used for this purpose. It is usually so designed that, upon reception of weak television signals, the automatic volume control circuit delivers no or substantially no voltage, so that it cannot be sharply determined whether a television signal is received or not. Even when a distorted television signal is received, the value of the voltage delivered by the circuit for automatic volume control does not provide an indication as to whether the received television signal is distorted or not.

The circuit arrangement according to the invention provides a solution of this problem. According to the invention, a circuit which amplifies the frame synchronizing pulses, has derived from it a blocking voltage. The blocking voltage is applied to those circuits in the receiver which are to be blocked if no television signal at all or a distorted television signal is received.

The circuit arrangement of the invention is based upon recognition of the fact that the frame-synchronizing pulse occurs only during about 1% of a frame period. If, therefore, a good (i.e. not substantially distorted) television signal is received, an amplifying element which must amplify this frame-synchronizing pulse also conveys current only during 1% of the time. If, on the contrary, no television signal at all or a distorted television signal is received, the time during which the frame-synchronizing amplifier conveys current is considerably longer than the said 1% of a frame period. It is thus possible sharply to distinguish whether a good television signal, no television signal at all or a distorted television signal is received.

In order that the invention may be readily carried into effect, several embodiments thereof will now be described in detail, by way of example, with reference to the accompanying drawings, in which.

Figure 1:
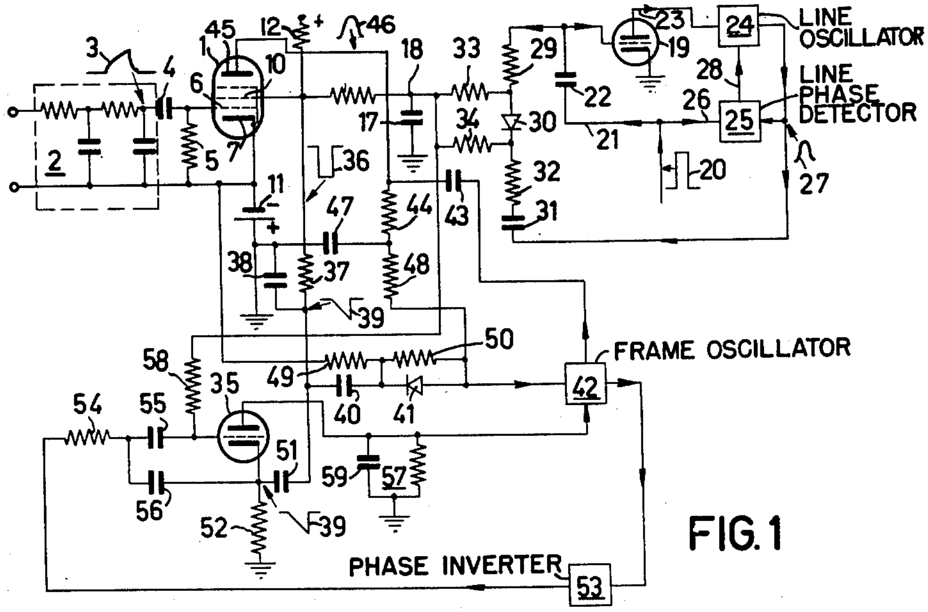
FIG. 1 is a circuit diagram showing a first embodiment of the invention.

In FIG. 1, tube 1 represents a frame-synchronizing amplifier to which the synchronizing signal, integrated in an integrating network 2, is supplied. The line-synchronizing signals are separated from the frame-synchronizing signals in the integrating network 2, the input terminals of which are connected to the synchronization separator present in the receiver, so that at the output terminals of the integrating network 2 there are set up frame-synchronizing pulses 3 which are supplied through a grid capacitor 4 and a grid-leak resistor 5 to a control grid 6 of the frame-synchronizing amplifier 1. Because the frame-synchronizing pulses are positive-going, the capacitor 4 is negatively charged by the grid current flowing to the control grid 6. Since the time constant of the network 4, 5 is chosen to be high with respect to a frame period, the biassing potential, required between grid 6 and cathode 7 of the tube 1 when a regular television signal is received, is obtained by means of this grid rectification.

As previously mentioned, the tube 1 conveys current only during 1% of a frame period when a good television signal is received, since during one frame period, for example 312½ lines are scanned in an interlaced 625-line television system, whereas a frame-synchronizing pulse emitted after each frame period has a duration of about 3 lines. The negative charge of capacitor 4 blocks the tube 1 so that only a frame-synchronizing pulse occurring is capable of releasing tube 1.

Figure 3:
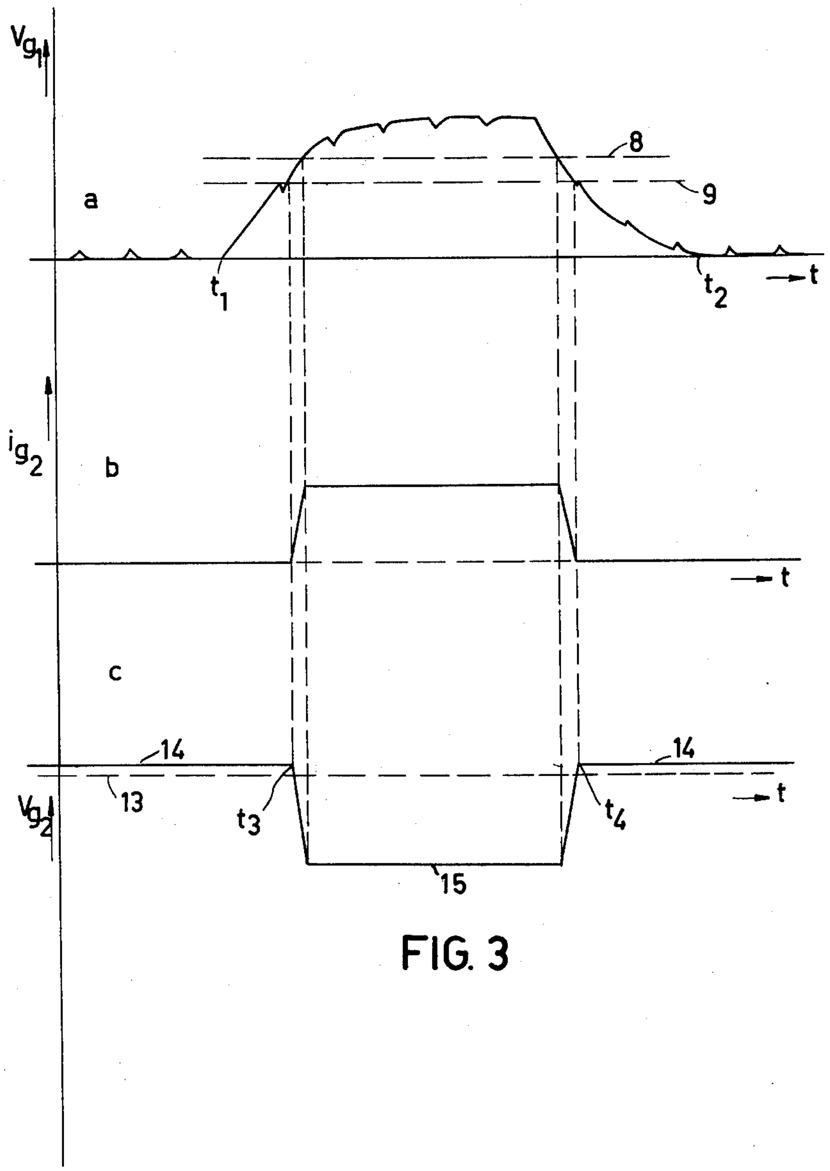
FIG. 3 is a set of curves illustrating the operation of the circuit of the invention.

This is clarified with reference to FIG. 3. FIG. 3*a* shows the integrated synchronizing signal, the frame-synchronizing pulses being active approximately from the moment $t_1$ to the moment $t_2$. By a suitable choice of the elements 4 and 5 and the grid current-grid voltage characteristic of tube 1, it may be ensured that the portion of the frame-synchronizing pulse located above line 8 will not increase the anode current of tube 1. If the cut-off voltage between grid 6 and cathode 7 of tube 1 is determined by line 9, it will be evident that the tube 1 can convey current only from the moment $t_3$ to the moment $t_4$. In the example under consideration, the required output voltage is derived from a screen grid 10 of tube 1, the other portion of tube 1 being used for other purposes in a manner which will be described hereinafter.

Due to the said method of control between the grid and the cathode of tube 1, the screen-grid current $i_{g2}$ to the screen grid 10 has a shape as shown in FIG. 3*b*.

In order to obtain the required blocking voltage for the circuits to be blocked, the cathode 7 is connected to the negative terminal of a direct voltage source 11 the positive terminal of which is connected to earth. In addition, the screen grid 10 is connected via a resistor 12 to the positive terminal of a second voltage source (not shown) the negative terminal of which is connected to earth. The direct voltage delivered by this second direct voltage source is considerably less than the voltage delivered by the voltage source 11. The difference between the direct voltages of the two direct voltage sources is chosen to be such that, when the tube 1 amplifies a normal frame-synchronizing pulse 3, the screen grid 10 is substantially at earth potential.

This is clarified with reference to FIG. 3*c*. In this figure, the voltage at the screen grid 10 is represented as a function of time when a screen-grid current $i_{g2}$ flows, as shown in FIG. 3*b*. Since the duration $t_4-t_3$ is about 1% of a frame period, the mean value of the voltage at screen grid 10 corresponds to line 13 in FIG. 3*c*. When the tube 1 does not convey current at all, the voltage at the screen grid 10 has a value equal to that of the second voltage source. This voltage level is indicated by line 14 in FIG. 3*c*. When the tube 1 conveys current, then during the greater part of this time the voltage at screen grid 10 has a value as indicated by the level 15 in FIG. 3*c*. The value of the voltage delivered by the two direct voltage sources is now such that the level of line 13 substantially corresponds to earth potential. Consequently, when a normal television signal is received, the mean value of the voltage at screen grid 10 is substantially at earth potential.

The voltage at screen grid 10 is filtered by means of the network comprising a resistor 16 and a capacitor 17, so that point 18 is always substantially at earth potential when a good television signal is received.

If, however, a television signal is not received, a noise signal is developed, as mentioned in the preamble, which noise signal is also supplied to the input terminals of the integrating network 2. However, such a noise signal is completely eliminated by the action of the integrating network 2 so that an output signal is not present at all at the output terminals of this network if no television signal is received. The negative charge of capacitor 4 can leak away and the biassing potential between the grid 6 and the cathode 7 disappears. This implies that the tube 1 always keeps conveying current and this again results in the voltage at screen grid 10 being substantially continuously at the potential indicated by line 15 in FIG. 3*c*. A voltage which is strongly negative with respect to earth then occurs at point 18. Assuming, for example, that a direct voltage of about 60 volts is delivered by the voltage source 11, the point 18 is also at substantially −60 volts with respect to earth if no television signal is received.

This negative voltage permits the blocking of several circuits in the receiver which would otherwise be controlled by the developed noise signal in an undesirable manner. A first example thereof is given in FIG. 1 in which line-synchronizing pulses 20 are supplied to a tube 19 via a lead 21 and a grid capacitor 22. The anode of tube 19 is connected via a lead 23 to a line oscillator 24. The latter is readjusted in the state of synchronization by means of a line phase detector 25. For this purpose, the line phase detector 25 has supplied to it through a lead 26 the line-synchronizing pulses 20, together with fly-back pulses 27 obtained from the line oscillator 24. The output voltage of phase detector 25 is supplied through a lead 28 to the oscillator 24 for the trimming thereof. However, when a state of non-synchronization occurs, the direct synchronization which is established by means of the line-synchronizing pulses supplied via the lead 23, serves to change the state of non-synchronization to a state of synchronization. In order to ensure that the tube 19 is blocked in the state of synchronization, the line-synchronizing pulses 20 are supplied via capacitor 22 and a resistor 29 to a diode 30 which has also supplied to it the fly-back pulses 27 via a capacitor 31 and a resistor 32. In the state of synchronization, the pulses 20 and 27 coincide and the diode 30 conveys current so that the capacitor 22 acquires a negative charge which cuts off the tube 19. In the state of non-synchronization, the pulses 20 and 27 do not coincide so that the negative charge of capacitor 22 disappears and the line-synchronizing pulses 20 can reach the lead 23 through the tube 19.

In the description of this so-called line-catching circuit it has been assumed that a good television signal is received so that point 18 is substantially at earth potential and the operation of the line-catching circuit is not influenced by the potential at point 18. However, if no television signal is received, the developed noise signal, if tube 19 is not blocked by the potential of point 18 which is applied via resistors 33 and 29 to the control grid of tube 19, would reach through the lead 21 and the capacitor 22 the tube 19 and, after being amplified in this tube, would reach the line oscillator 24 through the lead 23. Such a noise signal causes the frequency of the line oscillator 24 to vary in a fully arbitrary manner, which is disastrous for the line output transformer included in the output tube which is controlled by means of the voltage obtained from the oscillator 24. However, since now the potential at point 18 decreases in the absence of a television signal to the potential of line 15 of FIG. 3*c*, the tube 19 is cut off and the noise signal cannot pentrate to the oscillator 24.

The point 18 is also connected via resistors 33 and 34 to the two ends of diode 30, so that this diode is always ready to convey current as soon as a good television signal is received, so that capacitor 22 is already charged before the potential across capacitor 17 has decreased to an extent such that the blocking due to the potential of point 18 is terminated. The blocking of tube 19 is then taken over by the voltage developed across capacitor 22 from the voltage developed across capacitor 17.

It will be evident that even in the absence of phase detector 25, the above-mentioned safeguarding circuit is important since the drawbacks with regard to the line output transformer subsist even when only direct synchronization is used. Also the diode 30, and the associated circuit elements 31, 32 and 34 may in this case be dispensed with.

A second possibility of application for the circuit comprising the tube 1 and the associated circuit elements exists when a television signal is received, but this television signal is distorted. Such distortion may occur, for example, if the high-frequency portion of the receiver is out of tune to an extent such that the audio-frequency carrier of the incoming television signal is insufficiently attenuated in the intermediate-frequency portion of the receiver, so that this acoustic signal with its modulations can penetrate to the video-portion of the receiver. This implies that the acoustic signal can also reach the amplifier 1 through the integrating network 2. In this case more particularly the low modulation frequencies of this acoustic signal play a part. Especially modulation frequencies of about 400 c./s. and lower cannot be eliminated by the integrating network 2 so that an approximately sinusoidal signal having frequencies of, say, 400 c./s. and less occur at the control grid of tube 1.

It is noted that demodulation of these frequencies modulated on the audio-frequency carrier is possible due to the normal video-detector fulfilling the function of amplitude detector for these signals.

If, therefore, such a sinusoidal signal occurs between the control grid 6 and cathode 7 of tube 1, this tube starts to convey current as soon as the sinusoidal signal releases the tube 1. For a frequency of 400 c./s., for example, this causes the tube 1 to convey current during a time which is considerably longer than 1% of a frame period. True, the potential at the screen grid 10 and hence that at point 18 is much less negative than indicated by line 15 in FIG. 3*c*, but if the $i_{g2}-V_{g1}$ characteristic curve of tube 1 is sufficiently steep and the voltage source 11 delivers a sufficiently high negative voltage, it may be ensured that the negative potential at point 18 is high enough to block the frame-phase detector tube 35, when a television signal is received which is distorted in the above-described manner.

For proper understanding of the foregoing, it is first necessary to explain the operation of the frame phase detector 35 and the direct synchronization of the frame oscillator 42. When a good television signal is received, the direct synchronization is established due to the frame synchronizing pulses 36, which have a shape as shown in FIG. 3*c*, being integrated by means of an integrating network comprising a resistor 37 and a capacitor 38, resulting in triangular frame synchronizing pulses 39 which are supplied through a capacitor 40, and a diode 41 in parallel with a resistor 50 for direct synchronization to the frame oscillator 42. The saw-tooth voltages produced by the frame oscillator 42 are differentiated in a differentiating network comprising a capacitor 43 and a resistor 44 so that fly-back pulses 46 are set up at the anode 45 of tube 1, which fly-back pulses ensure that current flows to the anode 45 if there is coincidence between the frame synchronizing pulses 3 and the fly-back pulses 46. According as the coincidence between the pulses 3 and 46 is better, more current flows to the anode 45, so that the negative voltage set up at this anode also increases. The negative voltage thus developed is filtered by means of resistor 44 and the common action of the capacitors 43 and 47, this negative voltage being applied via a resistor 48 to the anode of diode 41. In the state of synchronization of the frame-synchronizing device, the diode 41, the cathode of which is connected via a resistor 49 to the cathode 7 of tube 1, is fully blocked by the negative voltage obtained from the anode 45 and the integrated pulses 39 can reach the frame oscillator 42 only through the capacitor 40 and the resistor 50. However, in the state of non-synchronization, a negative voltage is not developed at the anode of 45, so that the diode 41 is conducting and the synchronizing pulses 39 can reach the frame oscillator 42 in non-attenuated form via capacitor 40 and diode 41. These non-attenuated synchronizing pulses 39 convert a state of non-synchronization into a state of synchronization. Once the state of synchronization is attained, the frame phase detector 35 also becomes operative. For this purpose, the synchronizing pulses 39 are supplied via a capacitor 51 to a cathode resistor 52 of tube 35. The output signal of 42 is also supplied through a phase-inverting circuit 53, a limiting resistor 54 and a grid capacitor 55 to the control grid of tube 35. A capacitor 56 is so proportioned with respect to resistor 52 that the reference signal supplied through 54 cannot penetrate to the cathode, but the synchronizing pulses 39 supplied via capacitor 51 can reach the control grid. It is thus ensured that the tube 35 conveys current as a function of the phase difference between the frame synchronizing pulses 39 and the reference signal obtained from the frame oscillator 42, so that the output voltage of tube 35, which is filtered in a network 57, is a measure of the said phase difference. The output voltage of 57 is applied to the frame oscillator 42 and serves apparently to increase the natural frequency of the frame oscillator 42 so that direct synchronization by means of attenuated frame synchronizing pulses is possible.

If a sinusoidal signal of about 400 c./s. is active at the grid 6 of tube 1, this signal is likewise be supplied through the screen grid 10, the resistor 37 and the capacitor 51 to the cathode resistor 52. Due to the higher frequency of the unwanted sinusoidal signal, the tube 35 can convey a greater mean current during the time that the reference signal and the signal supplied to cathode 52 release tube 35, than if the reference signal and the pulses 39 would be active so that a higher negative voltage than normal is developed at the smoothing network 57 when sound penetrates the synchronizing signal. This higher negative voltage can wholly detune the frame oscillator 42 and even result in the impossibility for this oscillator to oscillate. When the frame oscillator 42 is wholly blocked, the sinusoidal pulses alone determine the release of tube 35 and an even higher negative voltage is developed, so that it has become absolutely impossible for the frame oscillator 42 to become operative.

In order to avoid this disadvantage, the control grid of tube 35 is connected through a leak resistor 58 to the point 18. When a sinusoidal signal reaches control grid 6, the potential of point 18 decreases to an extent such that tube 35 is cut off. In this case, a negative voltage cannot be developed at all at the network 57 so that the natural frequency of the oscillator 42 is not varied. As soon as the high-frequency portion of the receiver is tuned correctly, the frame synchronizing pulses supplied through 40 can bring the oscillator 42 to the state of synchronization, without the necessity for the electrolytic capacitor 59 to discharge first.

It will be evident that undesirable detuning of the frame oscillator is also possible with a different mode of control of the raster-phase detector 35 if acoustic information penetrates the synchronizing signal. Thus, for example, instead of negative-going pulses 39, positive-going pulses may be supplied to the anode of tube 35, which pulses may give rise to an undue negative voltage at the smoothing network 57 if their frequency is considerably higher than 50 c./s. The foregoing also holds good when a positive control voltage is necessary for trimming the oscillator 42, since an undue positive voltage is also undesirable and the slow leaking away of this undue voltage prevents that a state of synchronization, after the sound has disappeared from the synchronizing signal, can be rapidly reached.

Figure 2:
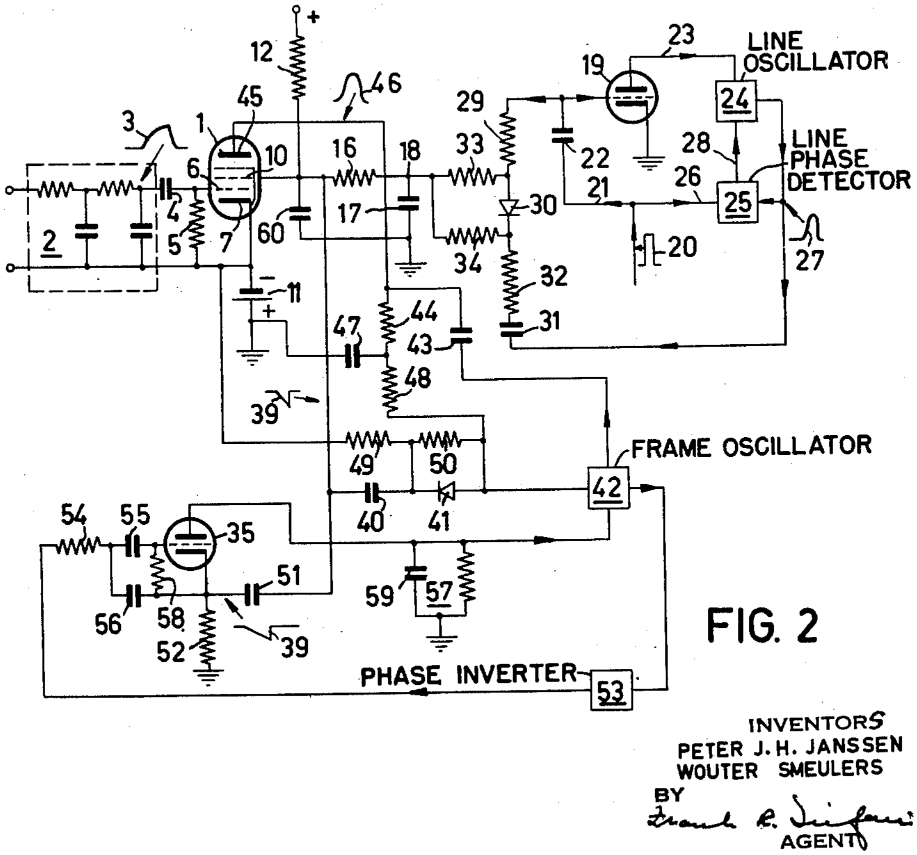
FIG. 2 is a circuit diagram showing a second embodiment of the invention.

A somewhat modified circuit diagram is shown in FIG. 2 in which corresponding parts are indicated as far as possible by the same reference numerals. It differs from FIG. 1 in that a capacitor 60 is connected between screen grid 10 and earth, capacitor 60 and resistor 12 serving to integrate the frame-synchronizing pulses developed at the screen grid 10. Consequently, the integrating network comprising resistor 37 and capacitor 38 may be omitted. A further difference is that the lower end of leak resistor 58 is now connected to the cathode of tube 35 instead of to point 18 and that the resistor 16 has a value much smaller than in the case of FIG. 1, since in the circuit arrangement of FIG. 2 a certain reaction of the potential at point 18 to the screen grid 10 is necessary in cases where a distorted television signal is received. In fact, the capacitor 17 is a comparatively large capacitor so that, if a sinusoidal signal of, for example, 400 c./s. is active at the control grid 6, the capacitor 17 is to be regarded as a constant voltage source which provides for the point 18 to be negative with respect to earth. The supply voltage active at the screen grid 10 is thus considerably lower than if point 18 is at earth potential, that is to say when synchronizing pulses are received, so that the amplitudes of the signals developed at the screen grid 10 due to the release and blocking of tube 1 by means of the sinusoidal voltage pulses are also smaller.

As a result thereof, the signals brought about by the sinusoidal control voltage and supplied through capacitor 40 to the diode 41 and resistor 50 and through capacitor 51 to the cathode resistor 52 also have an amplitude much smaller than that of the synchronizing pulses 39 produced upon reception of a good television signal. It is therefore impossible that an undue negative voltage is developed at the smoothing network 57 so that slight detuning of the frame oscillator 42 may occur, but complete blocking of this oscillator is impossible. Consequently, it is achieved in this circuit arrangement that, when a distorted television signal is received, this does not affect the frame synchronizing device. The operation with regard to the safeguarding of the line-catching circuit is wholly analogous to that of FIG. 1.

Another possibility is to apply the voltage of point 18 via the necessary circuit elements to the video-output tube. In fact, when a television signal is not received, a noise signal is also supplied to this video-output tube, which noise signal is visible on the viewing screen as white or black points according as a signal with negative or positive modulation is received. By causing the voltage of point 18 to block the video-output tube, when no television signal is received, the vision of these white or black points is prevented. The synchronizing signal must then not be supplied through the video-output tube to the synchronization separator, since otherwise a good synchronizing signal can never reach the tube 1 again when the video-output tube is blocked one time. In this case, the input terminals of the synchronization separator must therefore be connected, if desired via a separate amplifier, to the video-detector. Also if the video-signal contains sound as a result of incorrect tuning of the receiver, the voltage obtained from point 18 can block the video-output tube so that in this manner acoustic oscillations are also prevented from being made visible on the screen during the tuning of the receiver.

If the video-output tube is not blocked by the direct voltage obtained from point 18, the input terminal of the synchronization separator may be connected to the output terminal of the video-output tube, since continuous blocking of this output tube need not to be feared now.

It will be evident that the synchronization amplifier described in the examples under consideration need not be combined with the coincidence detector, for which purpose the anode portion of tube 1 is used. Thus, it is possible to use as the synchronization amplifier a triode in which the control grid and the cathode are connected in a similar manner as the control grid 6 and the cathode 7 of tube 1. The anode of this triode then takes the place of the screen grid 10. The coincidence detector, which must deliver the blocking voltage for the diode 41, may then comprise a further triode in which the synchronizing pulses 3 can be supplied in a normal manner to the control grid and the cathode, the anode of this second triode taking the place of the anode 45.

It is alternatively possible to design such a synchronization amplifier in the form of a transistor, more particularly in those receivers in which transistors are also used in the video-output stage, in the line synchronizing devices. The polarity of the potential at point 18 may then be different, but the principle of the invention that the potential at point 18 must be substantially equal to earth potential when a good television signal is received and either strongly positive, or strongly negative when no television signal at all or a distorted television signal is received, is also possible in the case of such a transistor amplifier.

It will be evident that the number of applications of the above-described circuit arrangement may still be increased. Thus, the voltage of point 18 may, for example, also be used for blocking the audio-frequency portion of the receiver so long as no good television signal is received.

What is claimed is:

1. In a television receiver, means for providing a control voltage responsive to absence of a substantially undistorted input signal, said means comprising an electron discharge device having a cathode, a control grid, and an output electrode, an integrating network, a source of frame and line synchronization signals, means applying said synchronization signals between said cathode and control grid by way of said integrating network, said integrating network having a time constant that is high with respect to the period of said frame signals, a first source of potential that is positive with respect to a reference potential, a second source of a potential that is negative with respect to said reference, resistance means connecting said output electrode to said first source, means connecting said cathode to said second source, said resistance means and first and second sources having values such that the mean potential at said output electrode is substantially said reference potential when an undistorted signal is received, and means integrating the potential at said output electrode to provide said control voltage.

2. In a television receiver, means for providing a control voltage responsive to the absence of a substantially undistorted input signal, said means comprising an electron discharge device having a cathode, a control grid, and an output electrode, a source of frame and line synchronizing signals, integrating circuit means connected to apply said synchronizing signals between the control grid and cathode of said discharge device, said integrating circuit means having a time constant that is high with respect to the period of said frame signals, grid capacitor and leak resistor means connected to said control grid to provide a bias for said discharge device when said signals are applied to said control grid, a first source of potential that is positive with respect to a reference potential, a second source of a potential that is negative with respect to said reference potential, resistance means connecting said output electrode to said first source, means connecting said cathode to said second source, said resistance means and first and second sources having values such that the mean potential at said output electrode is substantially said reference potential when an undistorted signal is received, and means integrating the potential at said output electrode to provide said control voltage.

3. The receiver of claim 2, in which said discharge device is a multigrid tube, and said output electrode is a screen grid.

4. A television receiver comprising a source of line and frame synchronizing signals, line deflection oscillator means, gate means applying said line synchronizing signals to said line deflection oscillator means, an electron discharge device having a cathode, a control grid, and an output electrode, integrating circuit means connecting said source of signals between said control grid and cathode, said integrating circuit means having a time constant that is high with respect to the period of said frame signals, grid capacitor and leak resistor means connected to said control grid to provide a bias for said discharge device when said synchronization signals are applied to said control grid, a source of operating potential having a first terminal positive with respect to a reference potential, and a second terminal negative with respect to said reference potential, means connecting said cathode to said second potential, resistor means connecting said output electrode to said first terminal so that the mean potential at said output electrode is substantially said reference potential when a substantially undistorted television signal is received, and filter circuit means connecting said output electrode to said gate circuit whereby said gate circuit is blocked when the mean potential of said output electrode is negative with respect to said reference potential.

5. A television receiver comprising a source of line and frame synchronizing signals, frame deflection oscillator means, phase detecting means connected to provide a frequency controlling potential to said oscillator means responsive to the phase between the output of said oscillator and said frame synchronizing signals, an electron discharge device having a cathode, a control grid, and an output electrode, integrating circuit means connecting said source of signals between said control grid and cathode, said integrating circuit means having a time constant that is high with respect to the period of said frame signals, grid capacitor and leak resistor means connected to said control grid to provide a bias for said discharge device when said synchronization signals are applied to said control grid, a source of operating potential having a first terminal positive with respect to a reference potential, and a second terminal negative with respect to said reference potential, means connecting said cathode to said second potential, resistor means connecting said output electrode to said first terminal so that the mean potential at said output electrode is substantially said reference potential when a substantially undistorted television signal is received, and filter circuit means connecting said output electrode to said phase detecting means to inhibit the application of said frequency controlling potential to said oscillator means when the mean potential of said output electrode is negative with respect to said reference potential.

References Cited in the file of this patent

UNITED STATES PATENTS

| | | |
|---|---|---|
| 2,151,773 | Koch | Mar. 28, 1939 |
| 2,215,285 | Ballard | Sept. 17, 1940 |
| 2,521,146 | Blayney | Sept. 6, 1950 |
| 2,907,822 | Davies | Oct. 6, 1959 |